Figure 4:
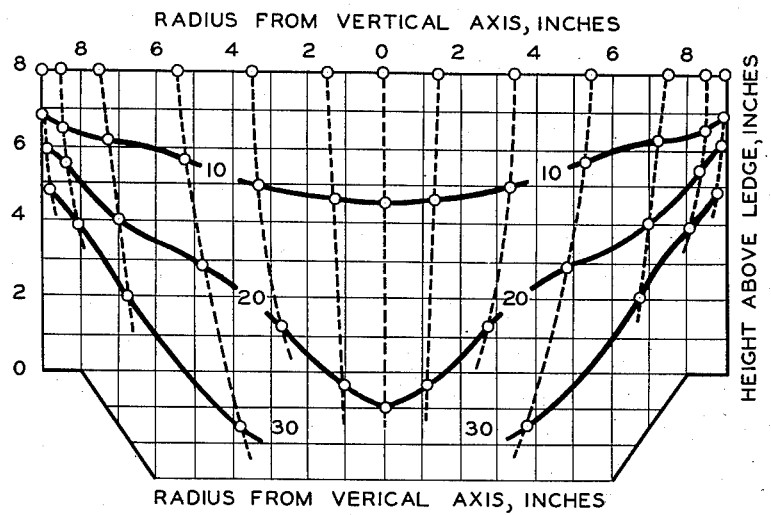

Aug. 21, 1956  R. L. McINTIRE  2,759,881
MEANS AND METHOD FOR CONVERTING HYDROCARBONS
Filed Oct. 9, 1950  2 Sheets-Sheet 1
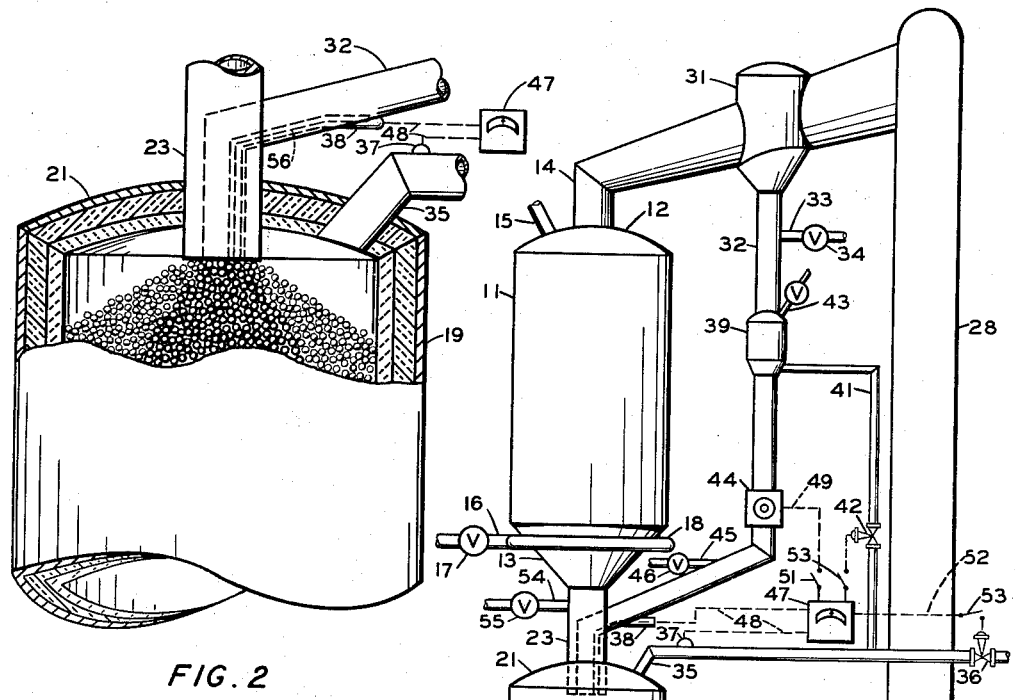
FIG. 1
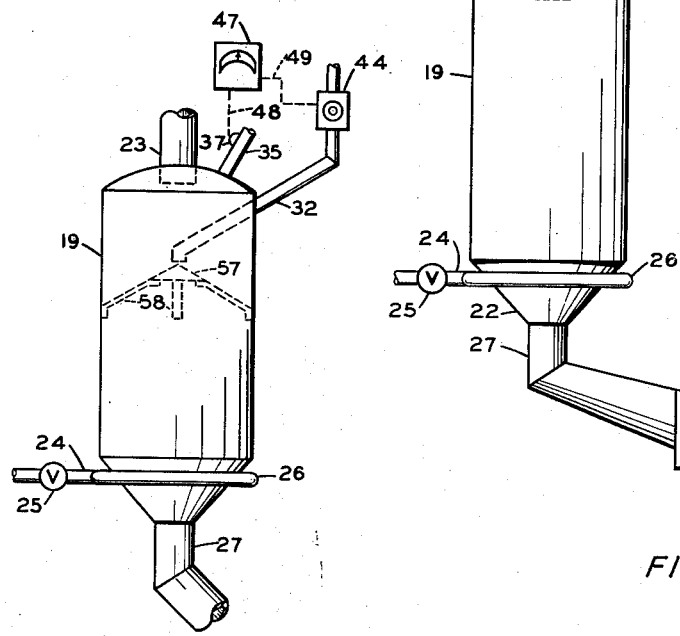
FIG. 2
FIG. 3
INVENTOR.
R.L. MC INTIRE
BY *Hudson and Young*
ATTORNEYS

United States Patent Office 2,759,881
Patented Aug. 21, 1956

2,759,881

MEANS AND METHOD FOR CONVERTING HYDROCARBONS

Robert L. McIntire, Bartlesville, Okla., assignor to Phillips Petroleum Company, a corporation of Delaware Application October 9, 1950, Serial No. 189,193

7 Claims. (Cl. 196—55)

This invention relates to the conversion of hydrocarbons. In one of its more specific aspects, it relates to the conversion of hydrocarbons in pebble heater apparatus. In another of its more specific aspects it relates to improved pebble heater apparatus for the conversion of hydrocarbons. In another of its more specific aspects it relates to a means and method for evenly distributing reactant material througout a pebble conversion chamber.

Thermal conversion processes which are carried out in so-called pebble heater apparatus utilize a flowing mass of solid heat exchange material, which mass is heated to a high temperature by passing hot gas therethrough in a first direct heat exchange step and is then caused to contact gaseous reactant materials, furnishing heat thereto in a second direct heat exchange. The conventional pebble heater apparatus generally comprises two chambers which may be disposed in substantially vertical alignment. The solid heat exchange material is introduced into the upper portion of the first chamber. That material forms a gravitating bed of solid heat exchange material which flows downwardly through the chamber in direct heat exchange with hot gaseous heat exchange material. The solid heat exchange material is heated to a high temperature in the heat exchange and is then gravitated to a second chamber in which the hot solid heat exchange material is caused to contact gaseous reactant materials in a second direct heat exchange relation furnishing heat for the treatment or conversion of the gaseous materials.

Conventional pebble heater chambers of pebble heater apparatus are generally formed as cylinders in which a solid heat exchange material is collected in the form of a moving bed. Hot heat exchange gases are sometimes introduced into the cylindrical bed at the periphery of its lower end portion and are sometimes introduced through a refractory arch which supports the moving pebble bed. The solid heat exchange material is drawn from substantially a central point in the bottom of the bed and is passed downwardly into a gas heating chamber where a second moving bed of solid heat exchange material is formed.

One disadvantage in the operation of conventional pebble reaction chambers is that it is most difficult to establish uniform flow of reactant materials in contact with uniformly heated pebbles from the pebble heater chamber. In the withdrawal of solid heat exchange material from a substantially central point in the bottom of a pebble reaction chamber, the moving solid heat exchange material tends to form a cone. That material which is below and outside of the cone remains in what is substantially a stagnant area. At the same time when solid heat exchange material is introduced centrally into the upper portion of the pebble reaction chamber, the top of the solid heat exchange material forms a cone extending downwardly and outwardly from the solid material inlet in the top of the chamber. It will thus be seen that the gravitating pebble bed is of lesser thickness at its periphery than at its axis because of the fact that the top of the bed is in the shape of a cone.

Reactant materials which are introduced into the reaction chamber are raised to conversion temperature by direct heat exchange with the hot solid heat exchange material in the reaction chamber and resulting reaction products are removed from the upper portion of the reaction chamber. It has heretofore been thought that the gaseous material which flows upwardly through the gravitating bed of solid heat exchange material within the reaction chamber tends to follow the path of least resistance. That path of least resistance would be along the periphery of the gravitating solid material bed inasmuch as the bed is thinner at its periphery than at its axis. I have discovered that a large portion of the non-uniform gas flow through a reaction chamber is due to the fact that gases tend to flow toward cool areas and the peripheral portion of the reaction chamber is the coolest area of the gravitating solid material bed within the reaction chamber. The gases are caused to expand in the hot areas of the reaction chamber and contract in the cooler areas of that chamber. Thus flow of gaseous material to the cooler areas results.

There are several reasons why the peripheral portion of the solid material bed is cooler than the axial portion thereof. It has been known for sometime that when a central solid material outlet is used, solid materials flowing through the central portion of the reaction chamber gravitate more rapidly than do the solid materials in the peripheral portion of the bed unless gravitation in that axial portion is retarded by some flow control means such as baffles or the like. Thus the solid materials flowing through the central portion of the bed normally have less contact time with the gaseous materials in the reaction chamber and give up less of their heat to those materials than do solid materials flowing at a lower flow rate. On the other hand, the solid heat exchange material flowing through the peripheral portion of the solid heat exchange material bed is caused to contact gaseous material for a longer period of time by reason of its lower flow rate, thus giving up greater amounts of heat to the reactant and product materials. As the peripheral portion of the solid material contact bed gives up greater amounts of heat, that portion of the bed is cooled, thus attracting greater amounts of gaseous materials by reason of contraction of those gases which in turn gain additional heat from the solid heat exchange material, lowering the temperature of that solid material still further. Still another reason for non-uniform solid material temperature is found in the fact that as solid materials are introduced into the top of the reaction chamber they are caused to contact some gaseous materials while at the peak of the cone of solid material formed at the top of the solid material bed. As the solid material rolls downwardly and outwardly over the top of the solid material bed, the solid material contacts even more of the gaseous materials, giving up heat thereto. Thus, as the solid material finally reaches the periphery of the solid material bed it has given up much more heat to gaseous material than has solid material which remains as an axial portion of the solid material bed.

Solid heat exchange material which is conventionally used in pebble heater apparatus is generally called "pebbles." The term "pebbles" as used herein denotes any solid refractory material of flowable size and form having strength, which is suitable to carry large amounts of heat from the pebble heating chamber to the gas heating chamber without rapid deterioration or substantial breaking. Pebbles conventionally used in pebble heater apparatus are substantially spherical in shape and range from about ⅛ inch to about 1 inch in diameter. In a high temperature process, pebbles having a diameter of between about ¼ to ⅜ inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material may be utilized to form such pebbles. Silicon carbide, alumina, periclase, beryllia, stellite, zerconia, and mullite may be satisfactorily used to form such pebbles or may be used in admixture with each other or with other materials. Pebbles formed of such materials, when properly fired, serve very well in high temperatures, some withstanding temperatures up to about 3500° F. Pebbles which are used may be either inert or catalytic as used in any selected process.

An object of this invention is to provied improved pebble heater apparatus for converting hydrocarbons. Another object of the invention is to provide an improved means for controlling flow of gaseous materials through reaction chambers of pebble heater apparatus. Another object of the invention is to provide an improved method for controlling the flow of gaseous materials through pebble beds in reaction chambers of pebble heater apparatus. Another object of the invention is to provide an improved method for uniformly distributing gaseous materials across a given cross-section of a reaction chamber of pebble heater apparatus. Other and further objects and advantages will be apparent to those skilled in the art upon study of the accompanying discussion and the drawings.

Broadly speaking, this invention comprises controlling the distribution of gaseous materials in a pebble heater reaction chamber by introducing a core of pebbles along the axis of such a reaction chamber, which core of pebbles is, upon introduction into the reaction chamber at a temperature lower than the temperature of introduction of other pebbles, introduced into that chamber.

Better understanding of the invention will be obtained upon reference to the diagrammatic drawings in which Figure 1 is an elevational schematic representation of a preferred form of the pebble heater apparatus of this invention. Figure 2 is a broken section elevation of the upper portion of the reaction chamber of this invention. Figure 3 is another modification of the reaction chamber of the pebble heater apparatus of this invention. Figure 4 is a graph showing normal pebble flow distribution through a pebble chamber.

Referring particularly to Figure 1 of the drawings, pebble heater chamber 11 is an upright elongated chamber closed at its upper and lower ends by closure members 12 and 13, respectively. Centrally positioned in closure member 12 is pebble inlet conduit 14. Gaseous effluent conduit 15 is provided in the upper end portion of pebble heater chamber 11, preferably in closure member 12. Inlet conduit 16, having flow control valve 17 provided therein, extends around the lower portion of pebble heater chamber 11, preferably as header member 18, and communicates with the interior of that chamber through closure member 13.

Reaction chamber 19 is also an upright elongated chamber, closed at its upper and lower ends by closure members 21 and 22, respectively. Pebble conduit 23 extends between closure member 13 of pebble heater chamber 11 and a central portion of closure member 21 of reaction chamber 19. Pebble conduit 23 preferably extends a short distance through closure member 21 into the upper end portion of reaction chamber 19. Inlet conduit 24, having flow control valve 25 positioned therein, extends preferably as header member 26 about the lower portion of reaction chamber 19 and communicates with the interior of that chamber through closure member 22. Pebble outlet conduit 27 extends from the lower end portion of reaction chamber 19 and is connected at its lower end portion to the lower end portion of elevator 28.

Elevator 28 may be a gas-lift or mechanical elevator, such as a bucket-type or helical lift-type elevator, depending upon the specific processes for which the pebble heater apparatus is utilized. Elevator 28 is connected at its upper end portion to the upper end portion of pebble inlet conduit 14. Pebble feeder 29 is provided intermediate the ends of pebble outlet conduit 27 and may be any conventional type pebble feeder, such as a star valve, a gate valve, a vibratory feeder, or a rotatable table feeder.

Pebble surge chamber 31 is provided intermediate the ends of pebble inlet conduit 14 and has an auxiliary outlet conduit 32 extending from its lower end portion. Conduit 32 extends from pebble surge chamber 31 into pebble conduit 23 and as a conduit of a diameter considerably smaller than that of conduit 23, extends downwardly through that conduit to a point at the outlet end of conduit 23 within reaction chamber 19. Inlet conduit 33, having flow control valve 34 provided therein, is connected to conduit 32 downstream of pebble surge chamber 31. Gaseous effluent conduit 35 extends from the upper end portion of reaction chamber 19 and is provided with flow control valve 36 therein. Analyzer 37 is connected to gaseous effluent conduit 35 upstream of flow control valve 36. Analyzer 38 may be connected to auxiliary pebble conduit 32, as shown, but is positioned upstream of pebble conduit 23. A small connecting conduit 56, shown in Figure 2, extends between the axial portion of chamber 19 and analyzer 38.

Auxiliary pebble heater chamber 39 is provided in auxiliary pebble conduit 32 at a point downstream from inlet conduit 33. Gaseous conduit 41, having flow control valve 42 provided therein, extends from gaseous effluent conduit 35 upstream from valve 36 to the lower end portion of auxiliary pebble heater chamber 39. Gaseous effluent conduit 43 is provided in the upper end portion of auxiliary pebble heater chamber 39. Auxiliary pebble flow controller 44 is provided in auxiliary pebble conduit 32. Inlet conduit 45, having flow control valve 46 provided therein, is connected to auxiliary pebble conduit 32 downstream of auxiliary pebble heater chamber 39 and may be upstream or downstream of feeder 44. Analyzers 37 and 38 are connected to controller 47 by conduits 48. Controller 47 is connected to auxiliary pebble flow controller 44 by conduit 49 having switch means 51 provided therein. Controller 47 is also connected to flow control valves 36 and 42 by conduits 52 having switch means 53 provided therein. Inlet conduit 54, having flow control valve 55 provided therein, is connected to pebble conduit 23.

The structure of the upper portion of reaction chamber 19 and its conduits will be more fully understood upon reference to Figure 2 of the drawings. Analyzer 38 is connected by conduit 56 which extends downwardly, preferably through the wall of conduit 32, to a point at the outlet end of conduit 32. Gaseous effluent conduit 35 extends from the upper end portion of reaction chamber 19 at a point above the normal level of pebbles within that chamber as shown by Figure 2.

In another modification of the invention, shown in Figure 3, auxiliary pebble conduit 32 extends into the interior of reaction chamber 19 through the side of the chamber instead of through pebble conduit 23 and extends downwardly into the interior of chamber 19 to a point immediately over the apex of a baffle 57 centrally positioned in that chamber. Baffle 57 is supported within chamber 19 by means of support members 58. In this modification of the invention, auxiliary pebble flow controller 44 is connected to controller 47 which in turn is connected only to analyzer 37.

In the operation of the device shown and described as Figure 1 of the drawings, pebbles are introduced into the upper portion of pebble heater chamber 11 and are gravitated downwardly through that chamber as a fluent contiguous pebble mass. Heating material is introduced into the lower portion of chamber 11 through conduit 16 and header member 18 and is caused to flow upwardly through heater chamber 11 countercurrent to the gravitating flow of pebbles in that chamber. The heating material may be a hot combustion gas obtained by burning a fuel at a point outside of heating chamber 11 or may be a fuel for obtaining combustion gas by burning the fuel on the surface of pebbles within that chamber or burning such fuel within chamber 11 but below or outside of the pebble bed within that chamber. Gaseous effluent is removed from the upper portion of chamber 11 through gaseous effluent conduit 15. Air in an amount sufficient to support combustion of the fuel and/or temper the combustion gases is also introduced through conduit 16. The gravitating pebbles are heated within pebble heater chamber 11 by direct heat exchange with the hot combustion gas to a temperature generally within the range of between 1200° F. and 2800° F., depending upon the reaction products desired from the conversion within reaction chamber 19. Temperatures within the range of between 1000° F. and 1600° F. are normally used for the conversion of hydrocarbon oils to form normally liquid olefins and aromatic hydrocarbon fractions, such as gasoline and the like. Temperatures within the range of between 1800° F. and 2600° F. are utilized for converting normally gaseous materials, such as ethane to ethylene, acetylene or the like. The temperature to which pebbles are heated within the pebble heating chamber 11 is normally about 200° F. above the reaction temperature desired in reaction chamber 19. The hot pebbles are gravitated through conduit 23 into the upper portion of reaction chamber 19 and gravitate through that chamber as a contiguous fluent mass therein.

Pebbles cooled during the conversion of hydrocarbons in chamber 19 are removed from the lower end of that chamber and are passed by means of pebble conduit 27 and elevator 28 to pebble inlet conduit 14. Pebbles within pebble inlet conduit 14 are caused to pass through pebble surge chamber 31 and a portion of the pebbles are removed from the lower end of pebble surge chamber 31 through auxiliary pebble conduit 32 and are introduced into reaction chamber 19 at a point within the confines of the top portion of the pebble bed in that chamber. The main portion of pebbles is passed through conduit 14 into the upper portion of chamber 11. The cool pebbles are introduced into chamber 19 as a stream within the hotter outer stream. There is thus very little lateral movement of the relatively cool pebbles.

Reactant materials are introduced into the lower portion of reaction chamber 19 through inlet conduit 24 and header member 26 and flow upwardly through that chamber countercurrent to the gravitating flow of heated pebbles within that chamber. Pebbles within reaction chamber 19 are cooled by the direct heat exchange with reactant materials until the pebble temperature at the outlet from that chamber is within the range of between 700° F. and 1500° F., depending upon the reaction being carried on within that chamber. Pebbles which are withdrawn from the bottom portion of surge chamber 31 are therefore at a temperature considerably lower than the temperature of pebbles withdrawn from the lower end portion of pebble heater chamber 11. Gaseous effluent material is removed from the upper portion of chamber 19 through outlet conduit 35.

Pebbles which are heated to a high temperature within pebble heater chamber 11 are gravitated into reaction chamber 19 and provide heat necessary for the reaction of the hydrocarbon reactant materials introduced into the bottom portion of that chamber. In the preferred form of this invention, a sample of the gaseous effluent is obtained adjacent the axial portion of reaction chamber 19, preferably through conduit 56, and is analyzed in analyzer 38 to determine the amount of unreacted materials in the effluent. The gaseous effluent obtained through conduit 35 is analyzed in analyzer 37 to determine the amount of unreacted materials in the total effluent from the reaction chamber. Analyzers 37 and 38, such as infra red analyzers, are connected to controller 47 which is adapted to control the rate of opeartion of auxiliary pebble flow controller 44 in auxiliary pebble conduit 32 when switch member 51 is closed and swith members 53 are opened. Controller 47 is adjusted in this modification to actuate pebble flow controller 44 in response to a difference in volume per cent of unreacted materials in the two analyzed streams. Thus, the temperature of the central core of pebbles is adjusted until the contents of the analyzed product streams balance in their content percentages. In that manner, the volume of relatively cool pebbles supplied to the axial portion of the pebble bed within reaction chamber 19 is controlled by the comparative analysis between effluent taken at the axis of the reaction chamber and the total effluent from that chamber. As a greater volume of cool pebbles is supplied to the axial portion of the pebble bed, additional reactant materials will be attracted to that portion of the bed by the relatively low temperature, thus causing a more uniform distribution of gaseous materials in the reaction chamber. Heat exchange between the relatively cool pebbles and the hotter pebbles obtained directly from pebble heater chamber 11 raises the temperature of pebbles introduced through conduit 32 so that those pebbles are maintained at a temperature which is at least that necessary for the conversion of the hydrocarbon reactant materials. The more rapid flow of pebbles through the axial portion of the reaction chamber does not give rise to as great a temperature differential as heretofore encountered and thus more uniform gas distribution is obtained. It is necessary to use the lowest possible reflux of cool pebbles in order to obtain maximum efficiency of the unit as a whole. Too great a recirculation would lower the gaseous effluent temperature below the desirable limit and result in a loss of feed throughput.

In another method of operation of this device, switch member 51 is opened and switch members 53 are closed and auxiliary pebble flow controller is set to operate at a fixed rate. Controller 47, which is actuated by the comparative analysis of effluent in analyzers 37 and 38, actuates flow control valves 36 and 42 in effluent conduit 35 and conduit 41, respectively. As valve 36 is at least partially closed, valve 42 is at least partially opened so as to cause at least a portion of the gaseous effluent from reaction chamber 19 to flow through conduit 41 into the lower portion of auxiliary pebble heater chamber 39 and the gaseous material is removed from that chamber through gaseous effluent conduit 43 in its upper portion. This method of operation has the advantage that the temperature within reaction chamber 19 is adjusted without varying the rate of pebble flow through auxiliary pebble conduit 32 and thus through pebble heater chamber 11 with the concomitant adjustment of the amount of heating material introduced into the lower portion of pebble heater chamber 11. The amount of hot gaseous effluent from reaction chamber 19 which is passed into direct heat exchange with pebbles in auxiliary pebble heater chamber 39 is only that amount which is necessary to raise the auxiliary supply of pebbles to a temperature such that uniform conversion of reactant materials in reaction chamber 19 is effected. Reaction products from gaseous effluent conduit 35 and gaseous effluent conduit 43 are combined if desired at a collection point, not shown.

The methods described above are modified in the device shown in Figure 3 of the drawings by introducing the cooler pebbles into a central point within reaction chamber 19 and causing those pebbles to be mixed slightly with the hotter pebbles within the reaction chamber. In this manner, relatively cool pebbles which are supplied to the central portion of the pebble bed within reaction chamber 19 are caused to form a somewhat larger core within that pebble bed by reason of the heat exchange between the cool pebbles and the hot pebbles. At the same time the cool pebbles are raised to a temperature such that reaction of reactant materials by direct heat exchange therewith is assured.

Better understanding of the problem of uneven heat distribution will be obtained upon reference to Figure 4 of the drawings. Figure 4 is a graph showing pebble flow distribution in a model pebble chamber. A model pebble chamber having a diameter of 18" and having a conical shaped bottom, the slope of which was approximately 50° from the horizontal, was filled with pebbles to a depth of 8". The pebble bed within that chamber was at a uniform level across the top. Colored pebbles were initially positioned and uniformly distributed in the top layer of the pebble bed. Given volumes of the pebbles were removed from the bottom of that chamber through a 2½" outlet and an equal amount of pebbles was added to the top of the chamber. The addition of the pebbles to the top of the chamber maintained constant pressure on the flow of pebbles by means of the weight of pebbles in the chamber. After a given volume of pebbles was removed from the pebble chamber, the pebbles which had been added were removed so as to determine the position of the colored pebbles in the pebble bed. Figure 4 shows the initial position of the colored pebbles across the top of the bed before withdrawal of any pebbles from the chamber and after withdrawal of 10, 20, and 30 liters of pebbles from the unit. Broken lines indicate the direction of flow of the colored pebbles. Isochores connect the positions plotted for the colored pebbles after each withdrawal step.

Study of the graph shown in Figure 4 of the drawings makes apparent the problem of heat distribution in a pebble chamber. If gases were uniformly distributed throughout the pebble chamber shown by the graph in Figure 4 of the drawings, the isochores would not only indicate pebble distribution but would also indicate temperature distribution within the chamber. As has been pointed out above, however, many factors combine to aggravate unevenness of gas distribution in pebble chambers. The peripheral portion of the pebble bed is inherently cooler than is the axial portion of the bed when that bed is maintained within a reaction chamber in which an endothermic reaction has taken place. It is obvious therefore that the isochores as shown in Figure 4 actually make a much more favorable showing than would be obtained in actual operation where gas distribution is not uniform. Isochores showing temperature distribution within a pebble chamber in actual operation would extend downwardly and inwardly at a much sharper angle than do the isochores shown in the graph of Figure 4.

Although the invention has been particularly described in connection with chambers having no baffle means in their central portion so as to retard the drop out of the central portion of that chamber, the invention is also particularly adapted to benefit uniform gas distribution throughout a chamber which maintains a centrally positioned baffle in the lower portion thereof so as to retard pebble flow through the axial portion of the chamber.

Temperature differentials between the hot pebbles gravitated into the reaction chamber directly from the pebble heater chamber and the cooler auxiliary pebbles from conduit 32 generally range between 300° F. and 2000° F., depending upon the specific reaction being carried out within the reaction chamber and the specific process of this invention which is utilized. When a temperature differential between 300° F. and 800° F. is maintained at the inlet point of pebbles into the reaction chamber a ratio within the range of 1:2 to 1:15 of the cool auxiliary pebbles to the hot pebbles is utilized. When a temperature differential of between 800° F. and 2000° F. is utilized a ratio within the range of 1:10 to 1:40 is maintained between the cool auxiliary pebbles and the hotter pebbles. The exact inlet temperature differential which is maintained between the cool and hot pebbles will be dependent upon the amount of preheating of the auxiliary pebbles which is obtained by direct heat exchange with the gaseous effluent from reaction chamber 19. As pointed out above it is preferred to regulate flow of pebbles through auxiliary pebble conduit 32 in accordance with a predetermined rate of flow and concomitantly control the distribution of gases through reaction chamber 19 by means of regulating the flow of gaseous effluent in direct heat exchange with the cooler auxiliary pebbles.

Many modifications of this invention will be apparent to those skilled in the art upon study of the accompanying disclosure and the drawings. It is believed that such modifications are within the spirit and the scope of this disclosure.

I claim:

1. A process for the conversion of hydrocarbons which comprises heating pebbles in a first chamber to a temperature within the range of between 1200° F. and 2800° F.; gravitating said hot pebbles into and through a second chamber; contacting said hot pebbles and hydrocarbon reactant materials in the lower portion of said second chamber in direct heat exchange; raising said hydrocarbon reactant materials to conversion temperature by said said direct heat exchange; passing resulting reaction products and unreacted said reactant materials in a gaseous state upwardly through said second chamber countercurrent to the gravitating flow of said pebbles therein; removing said gaseous effluent from the upper portion of said second chamber; withdrawing pebbles which are cooled by said reaction in said second chamber from the lower end of that chamber; recycling a portion of said cooled pebbles to said first chamber; diverting a portion of said cooled pebbles to the upper portion of said second chamber at a point centrally located with respect to the inlet of hot pebbles thereto from said first chamber and within the confines of the top central portion of the pebble bed within said second chamber, said cooled pebbles forming a cooler core of pebbles along the axis of the reaction chamber, said cooled pebbles being at a temperature between 300° F. and 2000° F. lower than the temperature of said pebbles gravitated into said second chamber from said first chamber and the ratio of said cooled pebbles to said hot pebbles being maintained constant within the range of between 1:2 to 1:40, and adjusting the temperature of said cooler pebbles in accordance with the degree of unreacted materials in the gaseous effluent from said second chamber.

2. The process of claim 1, wherein said cooled pebbles are introduced into said second chamber at a temperature between 300° F. and 800° F. lower than that of said pebbles from said first chamber and at a ratio of hot to cool pebbles within the range of between 1:2 to 1:15.

3. The process of claim 1, wherein said cooled pebbles are introduced into said second chamber at a temperature between 800° F. and 2000° F. lower than that of said pebbles from said first chamber and at a ratio of hot to cool pebbles within the range of between 1:10 to 1:40.

4. The process of claim 1, wherein the volume per cents of unreacted materials present in the top central and peripheral top portions of the pebble bed in said second chamber are determined; and temperature of said cooler pebbles is adjusted in accordance with a difference in volume per cent of unreacted materials in the top central and peripheral top portions of said pebble bed.

5. A process for the conversion of hydrocarbons which comprises heating pebbles in a first chamber to a temperature within the range of between 1200° F. and 2800° F.; gravitating said hot pebbles into and through a second chamber; contacting said hot pebbles and hydrocarbon reactant materials in the lower portion of said second chamber in direct heat exchange; raising said hydrocarbon reactant materials to conversion temperature by said direct heat exchange; passing resulting reaction products and unreacted said reactant materials in a gaseous state upwardly through said second chamber countercurrent to the gravitating flow of said pebbles therein; removing said gaseous effluent from the upper portion of said second chamber; withdrawing pebbles which are cooled by said reaction in said second chamber from the lower end of that chamber; recycling a portion of said cooled pebbles to said first chamber; and diverting a portion of said cooled pebbles to the upper portion of said second chamber at a point centrally located with respect to the inlet of hot pebbles thereto from said first chamber and within the confines of the top cenral portion of he pebble bed within said second chamber, said cooled pebbles forming a cooler core of pebbles along the axis of the reaction chamber, said cooled pebbles being at a temperature between 300° F. and 2000° F. lower than the temperature of said pebbles gravitated into said second chamber from said first chamber and the ratio of said cooled pebbles to said hot pebbles being maintained constant within the range of between 1:2 to 1:40.

6. The process of claim 5, wherein said cooled pebbles are heated to a predetermined temperature between 300° F. and 2000° F. lower than the temperature of pebbles gravitated from said first chamber; and adjusting the ratio of cooler to hotter pebbles within the range of 1:2 to 1:40 in accordance with the degree of unreacted materials in the gaseous effluent from said second chamber.

7. An improved pebble heater apparatus which comprises in combination a first upright closed elongated pebble chamber; a first pebble conduit in the upper end of said first chamber; a gaseous effluent conduit in the upper end portion of said first chamber; heating material inlet means in the lower portion of said first chamber; a second upright closed elongated pebble chamber below said first chamber; a second pebble conduit extending between the bottom of said first chamber and the top central portion of said second chamber; a contiguous bed of pebbles extending through said first chamber, said second pebble conduit, and said second chamber; a third pebble conduit in the bottom of said second chamber; reactant material inlet means in the lower portion of said second chamber; an elevator attached at its lower end portion to said third pebble conduit and attached at its upper end portion to said first pebble conduit; a fourth pebble conduit connected to said first pebble conduit intermediate said elevator and said first pebble chamber and extending to a point axially positioned in said pebble bed in the upper portion of said second chamber; a pebble feeder in said fourth pebble conduit; a preheater chamber in said fourth pebble conduit; a gaseous effluent conduit in the upper portion of said preheater chamber; a gaseous effluent conduit extending from the upper end portion of said second chamber; a first flow control valve in said gaseous effluent conduit from said second chamber; a gaseous material conduit extending from said gaseous effluent conduit in said second chamber upstream of said first flow control valve to the lower portion of said preheater chamber; a second flow control valve in said gaseous conduit; a first effluent analyzer operatively connected to the top axial portion of said second chamber; a second effluent analyzer operatively connected to said gaseous effluent conduit from said second chamber at a point upstream of said first flow control valve, and a controller operatively connected to said first and second analyzers and operatively connected to said pebble feeder and said first and second flow control valves.

References Cited in the file of this patent

UNITED STATES PATENTS

| | | |
|---|---|---|
| 2,416,214 | Payne | Feb. 18, 1947 |
| 2,432,520 | Ferro | Dec. 16, 1947 |
| 2,451,924 | Crowley | Oct. 19, 1948 |
| 2,490,336 | Crowley | Dec. 6, 1949 |
| 2,494,794 | Bonnell | Jan. 17, 1950 |
| 2,513,294 | Eastwood et al. | July 4, 1950 |
| 2,530,274 | Weber | Nov. 14, 1950 |
| 2,554,407 | Hepp | May 22, 1951 |